US005271530A

United States Patent [19]

Uehira et al.

[11] Patent Number: 5,271,530

[45] Date of Patent: Dec. 21, 1993

[54] FOAM DISPENSING PUMP CONTAINER

[75] Inventors: Shoji Uehira, Joyo; Takashi Miyagi, Yokohama, both of Japan

[73] Assignee: Daiwa Can Company, Japan

[21] Appl. No.: 910,100

[22] PCT Filed: Nov. 7, 1990

[86] PCT No.: PCT/JP90/01445

§ 371 Date: Jul. 7, 1992

§ 102(e) Date: Jul. 7, 1992

[87] PCT Pub. No.: WO92/08657

PCT Pub. Date: May 29, 1992

[51] Int. Cl.[5] .......... B67D 5/06; G01F 11/04

[52] U.S. Cl. .......... 222/190; 222/321; 222/384

[58] Field of Search .......... 239/333, 243; 222/153, 222/189, 190, 321, 384, 385

[56] References Cited

U.S. PATENT DOCUMENTS

| | | | |
|---|---|---|---|
| 2,119,906 | 6/1938 | Dorman | 222/190 X |
| 2,549,258 | 4/1951 | Stover | 239/343 X |
| 4,375,266 | 3/1983 | Magers | 222/384 X |
| 4,496,085 | 1/1985 | Ford et al. | 222/321 |
| 4,512,501 | 4/1985 | Foster | 222/321 X |
| 5,033,654 | 7/1991 | Bennett | 222/190 |
| 5,064,103 | 11/1991 | Bennett | 222/190 |
| 5,110,052 | 5/1992 | Graf et al. | 239/333 |

FOREIGN PATENT DOCUMENTS

| | | | |
|---|---|---|---|
| 0196737 | 8/1986 | European Pat. Off. . | |
| 484773 | 5/1992 | European Pat. Off. | 239/333 |
| 511894 | 11/1992 | European Pat. Off. | 239/333 |
| 58-2459 | 10/1977 | Japan . | |
| 58-23415 | 11/1977 | Japan . | |
| 57-20285 | 8/1978 | Japan . | |
| 54-28709 | 2/1979 | Japan . | |
| 60-27475 | 10/1982 | Japan . | |
| 62-101747 | 6/1987 | Japan . | |
| 62-177653 | 11/1987 | Japan . | |
| 63-21250 | 2/1988 | Japan . | |
| 63-23251 | 2/1988 | Japan . | |

*Primary Examiner*—David M. Mitchell
*Assistant Examiner*—Kenneth Bomberg
*Attorney, Agent, or Firm*—Merchant, Gould, Smith, Edell, Welter & Schmidt

[57] ABSTRACT

A foam dispensing, pump-actuated container to mix air and a liquid at a predetermined ratio has a mixing chamber at a juncture of a liquid flow path and an air flow path from an air cylinder, and the foam is homogenized by a porous sheet-like member provided on the downstream of the mixing chamber, and then dispensed through the dispenser nozzle. A liquid cylinder extends downwardly relative to the bottom surface of the air cylinder, so that a slidable portion of an air piston and a slidable portion of a liquid portion, both constituting the piston assembly of the foam dispensing pump, are set at different elevations for reciprocal movement. A check valve is provided in the air piston so that outer air is introduced into an air chamber defined by the air cylinder and the air piston through a gap around the outer circumferential surface of the air piston. The dispenser nozzle threadably engages the container such that the liquid in the container is sealed when the dispenser nozzle is threadably engaged with the container.

15 Claims, 5 Drawing Sheets

FOAM DISPENSING PUMP CONTAINER

TECHNICAL FIELD

The present invention relates to a foam dispensing pump container for foaming a foamable liquid, e.g., a detergent, hand soap, or shampoo, by mixing it with air, and thereafter homogenizing the foam and dispensing it small amount at a time.

BACKGROUND ART

Conventionally, foam dispensing pump containers based on the method of storing a high-pressure gas, e.g., a carbon dioxide gas and a Freon gas, in a container together with a foamable liquid creating foam upon dispensing and are in wide practical use. With the growing public consciousness for the global environment in these years, however, there have been apparent moves for totally banning use of such kinds of high-pressure gases in an attempt to protect the global atmosphere. Accordingly, demands have arisen for a foam dispensing pump container not using the high-pressure gas.

Japanese Utility Model Registration No. 1529456 (Japanese Utility Model Publication No. 58-23415) discloses a typical example of a foam dispensing pump container not using a high-pressure gas. The proposed arrangement according to this disclosure may be briefed as follows. That is, this foam dispensing pump container comprises a double cylinder which is provided at an opening portion of a container containing a liquid and which is constituted by air and liquid cylinders that are concentrically provided, a dip tube for allowing a bottom portion of the liquid cylinder and a bottom portion of the container to communicate with each other, a piston assembly constituted by air and liquid pistons integrally provided and movable up and down in the air and liquid cylinders, respectively, a nozzle member provided at an upper end of the piston assembly and having a foam dispensing hole portion, an air flow path for allowing the hole portion and the air cylinder to communicate with each other, a liquid flow path for allowing the liquid cylinder and the hole portion to communicate with each other, a first check valve disposed midway along the liquid flow path, a second check valve disposed in the liquid cylinder, a compression spring for urging the piston assembly to a top dead point with respect to the double cylinder, a lid member for fixing the double cylinder to the container and defining the air cylinder to guide insertion of the piston assembly therethrough, and an interposed permeable object or a porous member, e.g., a sponge, having a function of introducing outer air and generating and discharging foam at a juncture of the air flow path and the liquid flow path in the hole portion.

With the above arrangement, when the piston assembly moves up and down, the liquid supplied from the liquid cylinder and air supplied from the air cylinder are mixed in the interposed permeable object to generate foam and dispense it through the hole portion of the nozzle member.

However, the aforementioned interposed permeable object of this proposal has the first problem in that, since it has has two functions, i.e., a function of introducing the outer air into the air cylinder and a function of generating and discharging the foam, the fluid resistance upon introduction of the outer air essentially becomes large enough to disturb smooth reciprocal movement of the piston assembly. The interposed permeable object also has a second problem. That is, the liquid component of the foam remaining in the interposed permeable object gets dry and solidified in it, causing clogging.

Japanese Utility Model Registration No. 1467526 (Japanese Utility Model Publication No. 57-20285), which is filed by the same applicant as Japanese Utility Model Registration No. 1529456 described above, proposes another foam dispensing pump container not using a high-pressure gas. According to this second proposal, the double cylinder in the arrangement of above Japanese Utility Model Registration No. 1529456 is provided with the liquid cylinder which stands at the central portion of the bottom portion of the air cylinder, an outer air inlet hole having an operational valve is formed in the air cylinder to allow the liquid in the container to communicate with outer air outside the container in order to prevent the interior of the container from being set at a negative pressure, and the skirt portion of the air piston which slides on the inner surface of the air cylinder is formed thin.

However, the second proposal does not clearly describe a means for introducing outer air into the air cylinder and if the same arrangement as the first proposal is in use, it still has the same problems. Also, if the skirt portion of the air piston which slides on the inner surface of the air cylinder is to be formed thin so that the skirt portion is deformed inward when the interior of the air cylinder is set at the negative pressure, thereby introducing outer air into the air cylinder, high precise slidable contact between the air cylinder and the air piston must be maintained.

Even if such precise sliding contact is obtainable, sufficient air supply cannot be attained when the piston is slightly inclined while it is moved downward, and as a result, the quantity of air supplied to the interposed permeable object essentially varies and a constant mixing ratio of the air and liquid cannot be maintained.

DISCLOSURE OF INVENTION

The present invention has been made in view of the problems described above, and has an object to provide a foam dispensing pump container for dispensing foam by a manual pumping operation, wherein the introduction of outer air to generate foam takes place with a minimum of resistance so as to ensure smooth reciprocal movement of the piston assembly, a porous member employed for generating the foam may not be clogged by dry and solidified liquid component of the residued foam and the quantity of air introduced into the air cylinder is kept constant at all times to maintain a given mixing ratio of air and the liquid.

It is another object of the present invention to provide a foam dispensing pump container capable of threadably engaging a nozzle member with a lid member to close the container hermetically while the container is in transit or storage.

In order to achieve the above objects, a foam dispensing pump container according to the present invention comprises a double cylinder which is provided inside an opening portion of a container containing a liquid and which is constituted by an air cylinder for air pumping and a liquid cylinder for pumping liquid, both arranged concentrically, a dip tube for allowing a bottom portion of the liquid cylinder and a bottom portion of the container to communicate with each other, a piston assembly constituted by air and liquid pistons, both arranged concentrically and integrally to move up and down in the air and liquid cylinders respectively, a nozzle member provided at an upper end of the piston assembly and having a foam dispensing hole portion, an air flow path for allowing the hole portion and an interior of the air cylinder to communicate with each other, a liquid flow path for allowing an interior of the liquid cylinder and the hole portion to communicate with each other, a first check valve disposed midway along the liquid flow path, a second check valve disposed in the liquid cylinder, a porous member disposed in the hole portion, a compression spring for urging the piston assembly to a top dead point with respect to the double cylinder, an outer air inlet hole formed in the air cylinder to allow the liquid in the container and an outer air outside the container to communicate with each other and prevent the interior of the container from being set at a negative pressure and having an operational valve, and a lid member for fixing the double cylinder to the container and guiding insertion of the piston therethrough. Wherein the porous member is constituted by a porous sheet-like member, a juncture where the liquid flow path and the air flow path join with each other is provided in the upstream of the porous sheet-like member and serves as a mixing chamber for mixing the liquid and air, the liquid cylinder extends downwardly from a bottom surface of the air cylinder so that a slidable portion of the air piston and a slidable portion of the liquid piston of the piston assembly move up and down at different elevations and a third check valve is provided in the air piston so that outer air is introduced into an air chamber, defined by the air cylinder and the air piston, through an insertion gap between an outer circumferential surface of the air piston and an insertion hole of the lid member.

In order to achieve the above objects, a foam dispensing pump container accordingly to the present invention comprises a double cylinder which is provided inside an opening portion of a container containing a liquid and which is constituted by an air cylinder for pumping air and a liquid cylinder for pumping liquid, both arranged concentrically, a dip tube for allowing a bottom portion of the liquid cylinder and a bottom portion of the container to communicate with each other, a piston assembly constituted by air and liquid pistons, both arranged concentrically and integrally to move up and down in the air and liquid cylinders respectively, a nozzle member provided at an upper end of the piston assembly and having a foam dispensing hole portion, an air flow path for allowing the hole portion and an interior of the air cylinder to communicate with each other, a liquid flow path for allowing an interior of the liquid cylinder and the hole portion to communicate with each other, a first check valve disposed midway along the liquid flow path, a second check valve disposed in the liquid cylinder, a porous member disposed in the hole portion, a compression spring for urging the piston assembly to a top dead point with respect to the double cylinder, an outer air inlet hole formed in the air cylinder to allow the liquid in the container and outer air outside the container to communicate with each other and prevent the interior of the container from being set at a negative pressure and having an operational valve, and a lid member for fixing the double cylinder to the container and guiding insertion of the piston assembly therethrough. Wherein the porous member is constituted by a porous sheet-like member, a juncture where the liquid flow path and the air flow path join with each other is provided in the upstream of the porous sheet-like member and serves as a mixing chamber for mixing the liquid and air, the liquid cylinder extends downwardly from a bottom surface of the air cylinder so that a slidable portion of the air piston and a slidable portion of the liquid piston of the piston assembly move up and down at different elevations, a third check valve is provided in the air piston so that outer air is introduced into an air chamber, defined by the air cylinder and the air piston, through an insertion gap between an outer circumferential surface of the air piston and an insertion hole of the lid member.

An externally threaded portion is formed on the outer circumferential surface of the air piston in the vicinity of the nozzle member and an internally threaded portion is formed on the lid member to threadably engage with the external thread portion, such that a threadable engagement of the air piston and the lid member is maintained against repelling force of the compression spring.

MOST PREFERRED EMBODIMENTS OF THE INVENTION

Figure 1:
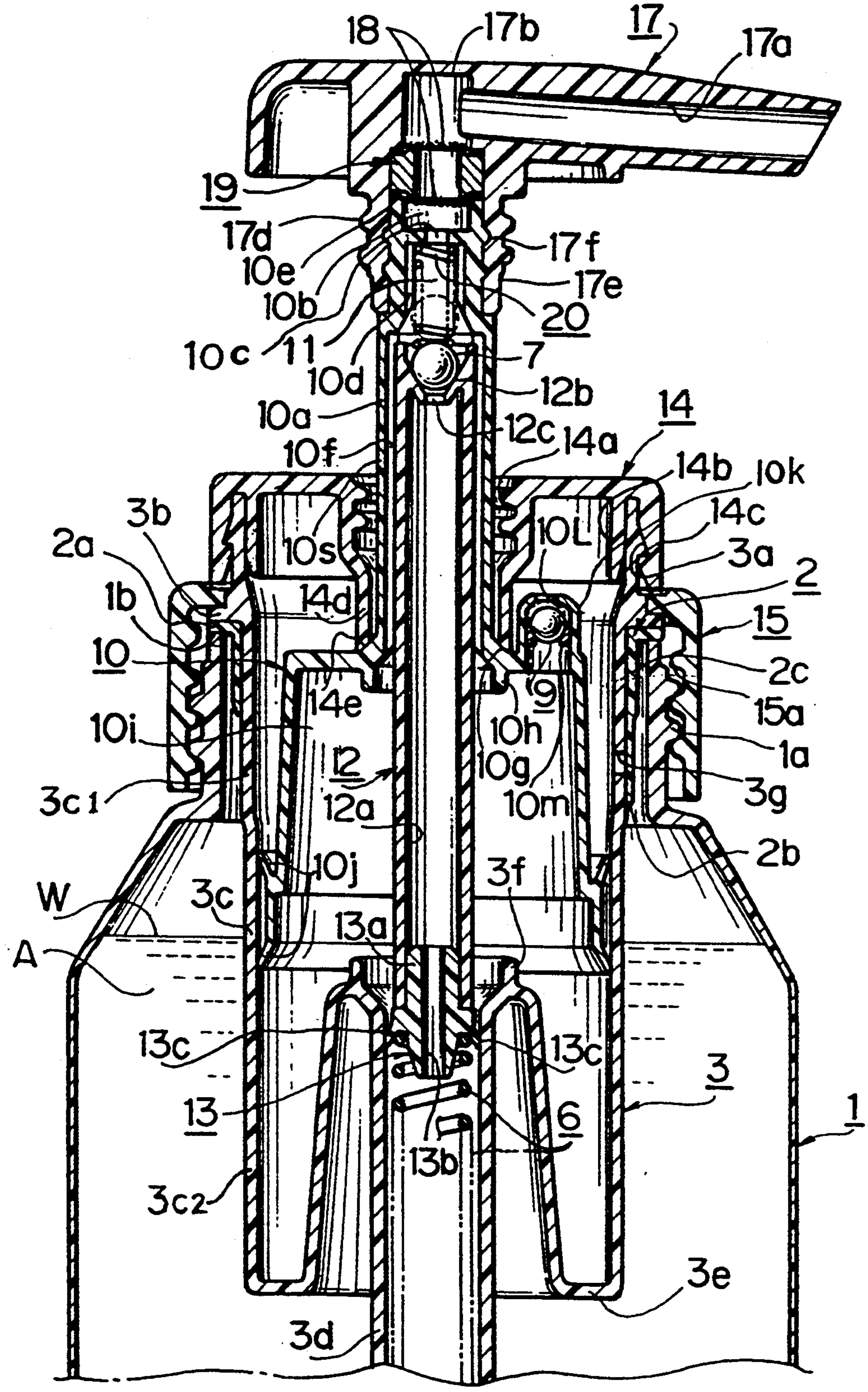
FIG. 1 is a longitudinal sectional view showing an upper portion of a foam dispensing pump container according to the first embodiment.
Figure 2:
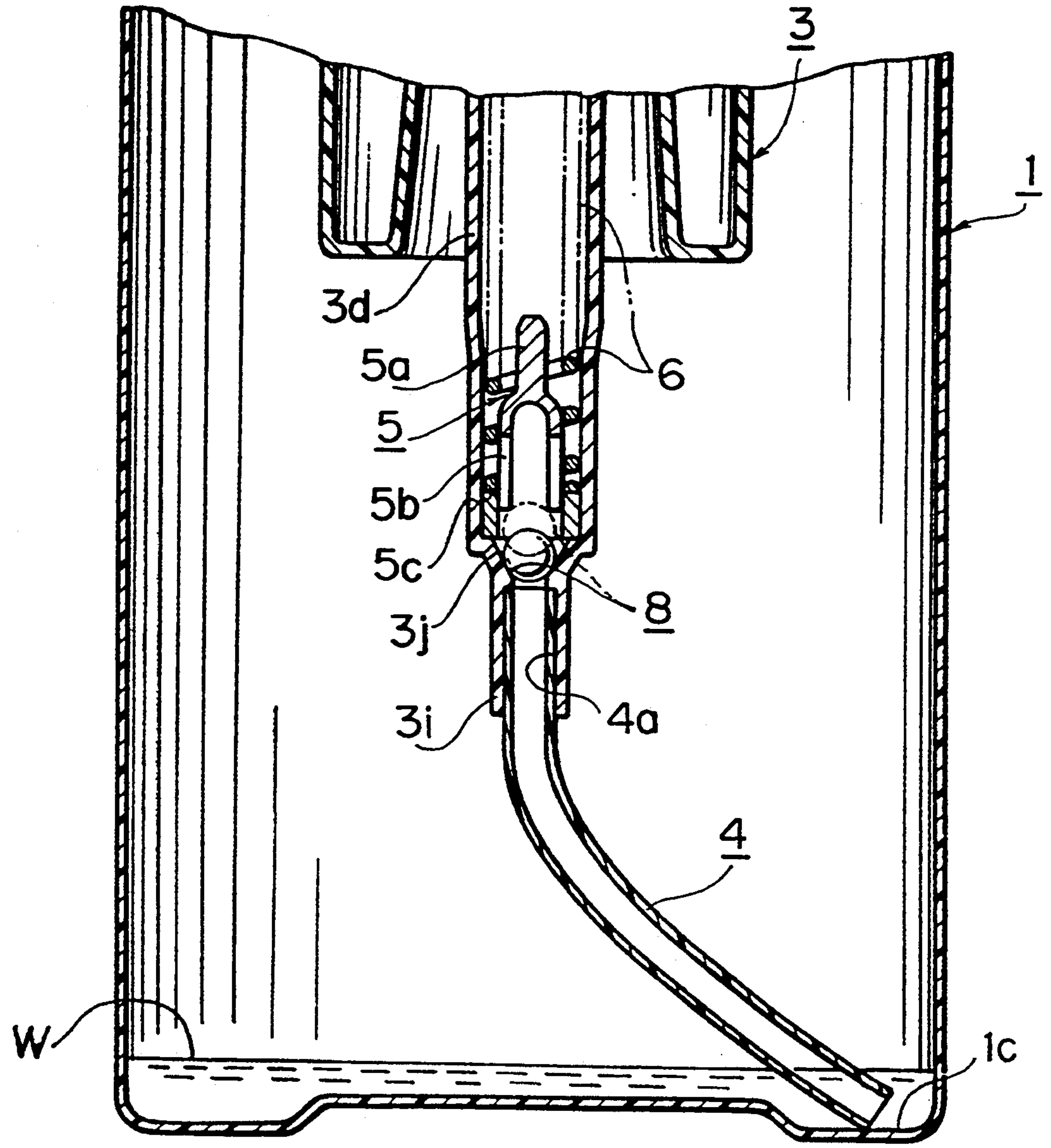
FIG. 2 is a longitudinal sectional view showing a lower portion of the foam dispensing pump container according to the first embodiment.

The first embodiment of a foam dispensing pump container according to the present invention will be described in two areas, an upper half and a lower half. FIG. 1 is a longitudinal sectional view showing the upper portion of the foam dispensing pump container, and FIG. 2 is a longitudinal sectional view showing the lower portion of the foam dispensing pump container.

Referring to FIG. 1, a cylindrical container 1, formed by, e.g., blow molding a resin or the like, carries, up to its maximum fill level W, a formable liquid A to which a surfactant or the like is added to impart foaming properties when mixed with air. An opening thread portion 1*a* having an externally threaded portion is integrally formed on the outer circumferential end portion of the upper opening portion of the container 1. When an inner thread portion 15*a*, which is an internally threaded portion of a large lid member 15, is held engaged with the opening thread portion 1*a*, the hermetic state of the container is maintained, and also, a complete pump assembly to be described later is fastened to the container 1.

The construction of the pump assembly will be described. The cylinder portion of the pump assembly is injection-molded from, e.g., a polypropylene resin and is constituted as a double cylinder 3 in which two cylinders, a large air cylinder 3*c* and a small liquid cylinder 3*d*, respectively, are concentrically formed, as shown in FIG. 1. The double cylinder 3 is open upward, and an annular fitting portion 3*a* having a locking portion inserted under pressure in and locked with a small lid member 14 and a flange portion 3*b* serving as a portion to be fastened to the container 1 are annularly formed on the open end portion of the double cylinder 3. Accordingly, the assembly as shown in FIG. 1 is obtained by assembling the respective components, to be described later, in the double cylinder 3, then fitting the aforesaid large lid member 15 to the flange portion 3*b* of the double cylinder 3, and finally pressing the annular fitting portion 3*a* until it is locked in a space between an outer wall locking portion 14*c* and an inner wall portion 14*b* of the small lid member 14, injection-molded from, e.g., a colored polypropylene resin, to form an integral assembly, so that the large lid member 15 may not come off from the pump assembly.

The double cylinder 3 has the annular fitting portion 3*a*, the flange portion 3*b*, the air cylinder portion 3*c*, and the liquid cylinder portion 3*d*, as shown in FIG. 1, wherein the air cylinder 3*c* is continuous from the flange portion 3*b*, and has an outer diameter slightly smaller than the inner diameter of the opening thread portion 1*a* of the container 1 and a substantially cylindrical shape. The liquid cylinder portion 3*d* is connected with the air cylinder portion 3*c* at the cylinder portion 3*c*, and has a substantially cylindrical shape concentric with the air cylinder portion 3*c* and a diameter smaller than that of the air cylinder portion 3*c*.

The double cylinder 3 will be described in more detail. The air cylinder portion 3*c* consists of a cylindrical portion constituted by a cylindrical guide portion $3c_1$ having an inner diameter smaller than that of the annular fitting portion 3*a* and a cylinder portion $3c_2$ connected with the cylindrical guide portion $3c_1$ through a taper portion and having an inner diameter smaller than that of the cylindrical guide portion $3c_1$, and a bottom portion 3*e* extending inwardly in the radial direction from the lower end of the cylinder portion $3c_2$ and having an upwardly inverted central portion. The liquid cylinder portion 3*d* is connected with the upper end of the inverted portion of the bottom portion 3*e* of the air cylinder portion 3*c* where a projecting seal portion 3*f* to be described later is formed, then extends downwardly from this connecting portion and terminates at its lower end with a reduced diameter.

Regarding the dimensional relationship among the inner diameters of the annular fitting portion 3*a*, the cylindrical guide portion $3c_1$, and the cylinder portion $3c_2$, and the outer diameter of a slidable seal portion 10*j* of an air piston 10 to be described later, the inner diameter of the annular fitting portion 3*a* is larger than the outer diameter of the slidable seal portion 10*j*, the inner diameter of the cylindrical guide portion $3c_1$ is substantially equal to the outer diameter of the slidable seal portion 10*j*, and the inner diameter of the cylinder portion $3c_2$ is slightly smaller than the outer diameter of the slidable seal portion 10*j*. The inner surface portions having different inner diameters are connected by taper portions. In the aforesaid arrangement, when an assembly of the air piston 10 and the liquid piston 12 is inserted in the corresponding cylinders, the liquid cylinder portion 3*d* and the liquid piston 12 are automatically aligned with each other simply by bringing down the slidable seal portion 10*j* of the air piston 10 through the annular fitting portion 3*a*, the flange portion 3*b*, the cylindrical guide portion $3c_1$, and the cylinder portion $3c_2$ so that the insertion is readily done and in addition, damage to slidable portions of the respective pistons that may be caused during such insertion can be eliminated.

The mixing ratio of the liquid to air is governed basically by the volumetic ratio of the air cylinder portion 3*c* to the liquid cylinder portion 3*d*, and to generate desired foam, the quantity of air must be sufficiently larger than that of the liquid. On the other hand, if an overall length of the double cylinder 3 is made excessively large, the container 1 must also be made tall enough to match such length. Therefore, the double cylinder is designed such that the central portion of the bottom portion 3*e* of the air cylinder portion 3*c* is inverted upward, and the liquid cylinder portion 3*d* is connected to the upper end portion of such inverted portion.

While the liquid cylinder portion 3*d* extends downwardly from the bottom portion 3*e* of the air cylinder portion 3*c*, the slidable seal portion 10*j* of the air piston 10 and a slidable seal portion 13*c* (to be described later) of the liquid piston 12 are set at different elevations. Hence, these freely slidable pistons are supported at least at two points, i.e., upper and lower, to enhance prevention of their tilting and waddling.

The annular projecting seal portion 3*f* is formed on the reverse side of the connecting portion connecting the liquid cylinder portion 3*d* with the air cylinder portions 3*c* so as to project upwardly in the air cylinder portion 3*c*. For transportation or storage, an air piston to be described later is sealingly fitted to the projecting seal portion 3*f* to maintain the hermetic state. Furthermore, the inner circumferential surface of the projecting seal portion 3*f* is formed to have a conical shape portion which continues to the inner circumferential surface of the liquid cylinder portion 3*d*, as shown in FIG. 1. Hence, a slidable seal member 13 to be described later can be smoothly inserted and assembled in the liquid cylinder portion 3*d* without interruption.

An outer air inlet hole portion 3*g* for introducing outer air into the container 1 through the aforesaid inner thread portion 14*a* of the small lid member 14 is formed in the cylindrical guide portion $3c_1$ of the air cylinder portion 3*c*. As the foamable liquid A is consumed, outer air of a volume equivalent to a volume of consumption of the liquid A is introduced into the container 1 through the outer air inlet hole portion 3*g* (see the right hand side portion of FIG. 1), so that the interior of the container 1 is prevented from being set at a negative pressure. An annular seal member 2 made of a soft resin is interposed between the flange portion 3*b* of the double cylinder 3 and an opening end portion 1*b* of the container 1 to maintain the hermetic state. The seal member 2 consists of a seal portion 2*a*, a thin tongue portion 2*b*, and an annular portion 2*c*. The seal portion 2*a* serves as a gasket to maintain the hermetic state when the large lid member 15 is threadably engaged with the container 1. The tongue portion 2*b* serving as a valve member to close the outer air inlet hole portion 3*g* is formed on part of the seal member 2 in such a manner that it is urged against the air cylinder 3. The annular portion 2*c* is fitted to the outer circumferential surface of the upper portion of the cylindrical guide portion $3c_1$ of the air cylinder portion 3*c*. The tongue portion 2*b* is elastically deformed to open only when outer air is introduced as described above, other than that, it always closes the outer air inlet hole portion 3*g* so that the liquid A may not leak into the air cylinder 3*c* through the outer air inlet hole portion 3*g* while the container is in transit or kept in stock.

Referring now to FIG. 2, part of a bottom portion 1c of the container 1 is formed deeper to enhance both ability to stand upright stably and rigidity of the container 1 as is conventionally known, and also to ensure that the liquid A can be completely drawn through a hollow dip tube 4 even when the foamable liquid A is consumed until the liquid level W goes down as shown in FIG. 2.

The liquid cylinder 3d of the double cylinder 3 is formed to extend downwardly and terminate with a lower hole portion 3i having a small diameter. An upper end 4a of the dip tube 4 is pressure-fitted into the lower hole portion 3i. A ball seat 3j is formed on the inner surface of a stepped portion between the lower hole portion 3i and the liquid cylinder 3d, and a second ball 8 made of a stainless steel or the like and having high corrosion resistance is seated on the ball seat 3j in such manner that the ball is freely movable between a position shown by the solid line and the position shown by the broken line. Furthermore, a plug member 5 is provided in the liquid cylinder 3d and placed over the ball seat 3j, as shown in FIG. 2. The plug member 5 restricts movements of the second ball 8 beyond the position shown by the broken line, and has an annular seat portion 5c to receive a coil spring 6 which gives repelling force to a dispenser nozzle member (to be described later) when the dispenser nozzle member is pressed down. A plug portion 5a is formed on the head portion of the plug member 5. During transportation or storage, the plug portion 5a is fitted in a liquid guide hole portion 13b of the slidable seal member 13 of the piston, so that leakage of the liquid A is eliminated. An opening portion 5b is formed between the plug portion 5a and the seat portion 5c, and when the second ball 8 is moved to the position indicated by the broken line, the liquid A is allowed into the liquid cylinder portion 3d through the opening portion 5b.

Referring again to FIG. 1, a portion of the pump assembly serving as the piston are moved up and down integrally in the air and liquid cylinder portions 3c and 3d of aforesaid double cylinder 3. For this purpose, the air piston 10 is of a hat-like construction constituted by a pair of upper and lower slidable seal portions 10j and an air chamber portion 10i. The slidable seal portion 10j ensures adequate sealing contacts when the air piston 10 slides vertically along the inner wall surface of the air cylinder portion 3c (or more specifically, the inner wall surface of the cylinder portion $3c_2$). In addition, a hollow rod portion 10a is formed integrally with the air piston 10 to extend upwardly from the central portion of the air chamber portion 10i. Also, as is apparent from FIG. 1, the slidable seal portions 10j of the air piston 10 contact the inner wall surface of the air cylinder portion 3c at two points, upper and lower, so that the desired hermetic state can be maintained even if a user depresses the air piston 10 obliquely, and as a result, a predetermined mixing ratio of the air to liquid can be maintained.

The liquid piston 12 is pressure fitted in and integrally fixed to the air piston 10 so that they are movable integrally. The liquid piston 12 is constituted by a cylindrical member (as shown in FIG. 1) to guide the liquid to its interior. The liquid piston 12 has a ball seat 12b at its upper portion for holding a first ball 7, and an opening portion 12c communicating with a liquid guide portion 12a.

Figure 4:
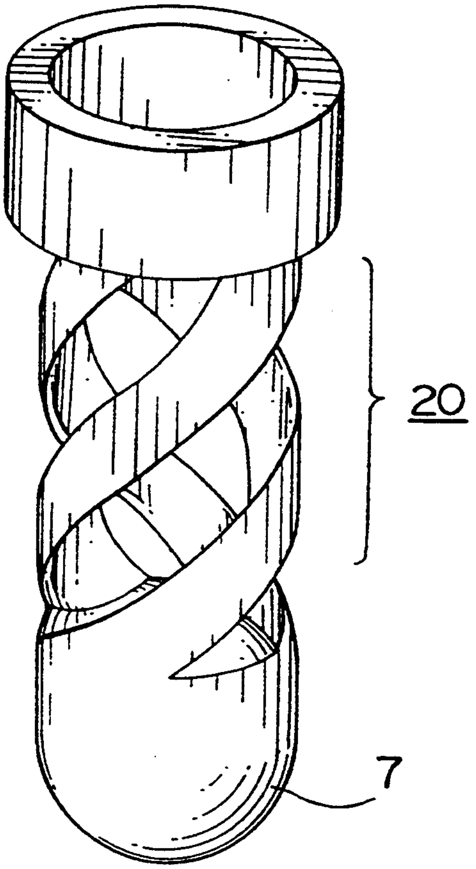
FIG. 4 is an external view of an integrally molded first ball and coil spring.

The first ball 7 is held at the position indicated by the solid line by means of a small coil spring 20. When operated as will be described later, the first ball is urged by the pressure of the liquid A in the liquid guide portion 12a and the small coil spring 20 is compressed so that the first ball 7 moves to a position indicated by a broken line to cause the opening portion 12c and a mixing chamber 11 to communicate with each other. As a result, the liquid is fed into the mixing chamber 11. The first ball 7 may be seated on the ball seat 12b by its own gravity but by providing the small coil spring 20 leakage of the liquid is prevented when the container 1 is tipped over. The first ball 7 may be formed integrally with the small coil spring 20 to a configulation as shown in FIG. 4 showing an integrally molded first ball and the coil spring.

A pressure fitted portion 13a of the slidable member 13 having the slidable seal member 13c which moves up and down sealingly in the liquid cylinder 3d is inserted in the lower end of the liquid piston 12, as shown in FIG. 1. The slidable member 13 has the liquid guide hole portion 13b which fits to the aforesaid plug portion 5a of the plug member 5 to maintain the hermetic state and also serves as a flow path through which the liquid is introduced. The upper end of the aforesaid coil spring 6 is abutted against the lower side of the slidable seal portion 13c to urge the integral assembly of the air and liquid pistons 10 and 12 to the position shown in FIG. 1.

A dispenser nozzle member 17 is pressure fitted in and fixed integrally to an end portion 10e of the rod portion 10a of the air piston 10. For this purpose, an urging insertion hole portion 17f having a recess is formed on the dispenser nozzle member 17, so that the projection of the rod portion 10a can be fitted fixedly in the urging insertion hole portion 17f. The mixing chamber 11 for generating a foam by mixing the liquid and air is formed at the upper end of the rod portion 10a and it serves also as a chamber to accommodate the said small coil spring 20. An opening hole portion 10c for allowing the foam, generated by mixing air and liquid, into a net member (to be described later) is formed at the upper center portion of the mixing chamber 11. Ribs 10d for locating the small coil spring 20 to the centered portion are radially formed around the opening hole portion 10c. A plurality of air passage portions 10f for guiding air in the air chamber 10i of the air piston 10 are radially formed below the ribs 10d. A seal portion 10h to fit to the aforesaid projecting seal portion 3f of the double cylinder member 3 is formed in the vicinity of the lower opening portions of the air passage portions 10f, so that the seal portion 10h can be fitted sealingly in the projecting seal portion 3f.

An outer air inlet check valve which operates when outer air is to be introduced is integrally provided on the upper wall of the air piston 10. This check valve is constituted by a check valve portion 10k incorporating a third ball 9 which is freely movable between the position indicated by the solid line and the position indicated by the broken line, an opening portion 10L which is open at the upper portion of the check valve portion 10k and is closed when the third ball 9 is moved upward, and a stopper portion 10m for holding the third ball 9 at the position indicated by the solid line to introduce the outer air through the opening portion 10L.

The rod portion 10a of the air piston 10 is guided to maintain a gap between its outer circumferential surface and the inner circumferential surface of an opening portion 14d of the small lid member 14, and through this gap outer air is introduced to the check valve accommodating the third ball 9.

Two net members 18 of about 200 meshes/inch each made of polyester fiber and having a thickness of 0.06 mm are pressure fitted one above the other with a spacer 19 therebetween in the aforesaid urging insertion hole portion 17*f* of the dispenser nozzle member 17. The diameter size of bubbles of the foam is governed by the mesh size of the net member 18 and when the bubbles having a random diameter in the mixing chamber portion 10*b* pass through the net member 18, they are changed to be fine uniform bubbles and dispensed through a hole portion 17*b* and a nozzle hole portion 17*a* of the dispenser nozzle member 17. The net members 18 may be of one-piece construction and may also be made of a nylon, polyethylene, polypropylene, or carbon fiber, or a stainless steel wire. Nets each having 20 to 400 meshes/inch and a thickness of 0.01 to 2 mm may be used and nets each having 50 to 300 meshes/inch and a thickness of 0.03 to 0.5 mm are more preferable.

In place of the net members 18, disk-like sheet members made of a thermoplastic resin, e.g., polyethylene or polypropylene, by injection-molding, each having a multiple of 0.03 to 0.5 mm pores and a thickness of 0.01 to 2 mm, or sintered bodies or etched metal plates each having the pores and thickness similar to those as aforesaid may be used.

An outer thread portion 17*d* having the externally threaded portion is formed on the outer surface of the urging insertion hole portion 17*f* of the dispenser nozzle member 17. The outer thread portion 17*d* can be sealingly threadably engaged with the internally threaded inner thread portion 14*a* of the small lid member 14, so that the hermetic state of container 1 can be maintained during long-term storage or transportation. For this purpose, the outer diameter of an outer circumferential portion 17*e* formed below the outer thread portion 17*d* is set slightly larger than the inner diameter of the opening portion 14*d* formed below the inner thread portion 14*a*. When the aforesaid outer thread portion 17*d* is engaged with the internally threaded inner thread portion 14*a* of the small lid member 14, the outer circumferential portion 17*e* is fitted in the opening portion 14*d*, thereby maintaining the hermetic state of the upper space of the air cylinder.

Figure 3:
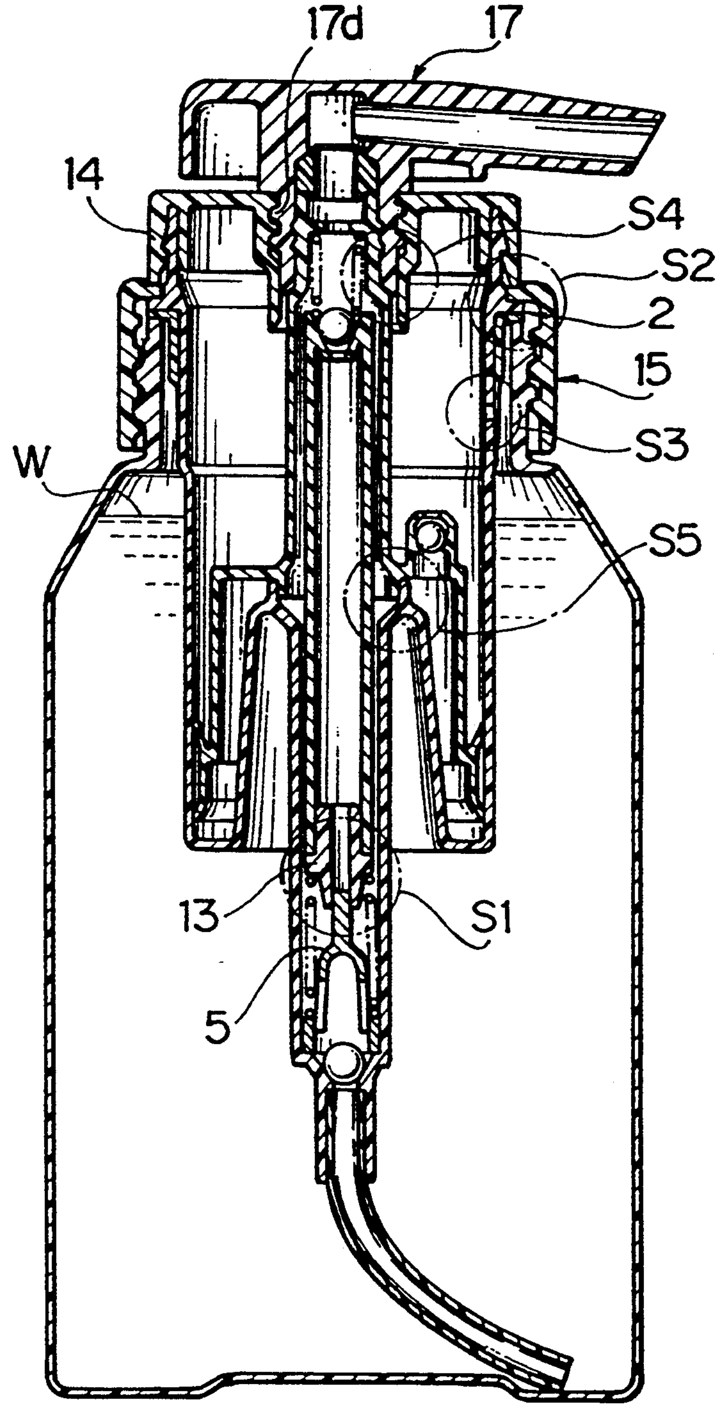
FIG. 3 is a longitudinal sectional view showing the aforesaid foam dispensing pump container which is set in a state for long-term storage or transportation.

The operation of the aforesaid arrangement will be sequentially described. FIG. 3 is a longitudinal sectional view of the aforesaid foam dispensing pump container set in a state for long-term storage or transportation.

Referring to FIG. 3, the container has the liquid up to the liquid level W, and the contacting portions of the respective components are in contact under pressure with each other sealingly so that the liquid may not leak when the container is not in use during transportation or display at a shop. To obtain this state, the nozzle member 17 is urged down to the small lid member 14 against the repelling force of the coil spring 6 and rotated to engage its outer thread portion 17*d* with the inner thread portion 14*a*.

As a result, a first seal portion S1 where the plug portion 5*a* of the plug member 5 is fitted in the liquid guide hole portion 13*b* of the slidable member 13 fixed to the liquid piston 12, a fifth seal portion S5 where the projecting seal portion 3*f* of the double cylinder 3 is fitted on the seal portion 10*h* of the air piston 10, and a fourth seal portion S4 where the outer circumferential portion 17*e* of the dispenser nozzle member 17 is fitted in the opening portion 14*d* of the small lid member 14 are respectively formed.

The large lid member 15 is threadably engaged with the container 1 through the seal member 2 to form second seal portion S2. The thin tongue portion 2*b* is integrally formed with the seal member 2 to close the outer air inlet hole portion 3*g* and form a third seal portion S3. Since the container, the air cylinder and the liquid cylinder are sealed at the first to fifth seal portions, the liquid in the container may not leak during transportation or storage.

The steps of dispensing the foam from the foam dispensing pump container having the aforesaid arrangement will be described with reference to FIGS. 1 and 2. Firstly, the container is released from the long-term storage state in FIG. 3 and the dispenser nozzle member 17 is depressed downward while the liquid A is not present in the liquid guide portion 12*a* of the liquid piston 12, so that the internal pressures of the air and liquid cylinders go up and urge the first and third balls 7 and 9 upward to the positions indicated by the broken lines respectively, while only the second ball 8 stays at the position indicated by the solid line.

Subsequently, when the dispenser nozzle member 17 is released, the integral assembly of the air and liquid pistons 10 and 12 is urged upward by the repelling force of the coil spring 6. At this time, a negative pressure is created in the interior of the liquid cylinder 3*d* to close the first check valve accommodating the first ball 7 and as the pressure in the interior of the liquid cylinder 3*d* goes further down the second check valve accommodating the second ball 8 is opened and the liquid A is drawn into the liquid cylinder. Simultaneously, a negative pressure is also created in the interior of the air chamber portion 10*i* to open the third check valve accommodating the third ball 9. As a result, outer air is smoothly supplied into the air chamber portion 10*i* through the gap between the rod portion 10*a* and the opening portion 14*d* of the small lid member 14 to prepare for foam dispensing.

When the integral piston assembly is moved downward again, the outer air introduced in the air chamber portion 10*i* of the air cylinder is pressurized to close the third check valve. As a result, the air having no other escape in the air chamber portion 10*i* is further pressurized and led upward into the mixing chamber 11 through the air passage portions 10*f*. Simultaneously, the liquid A in the liquid cylinder 3*d* is also pressurized and led upward through the liquid guide portion 12*a* to open first check valve comprising the first ball, suppressing repelling force of the coil spring 20, and flows into the mixing chamber 11.

As a result, the liquid A and air are mixed in the mixing chamber 11 to generate a foam having bubbles of random diameters, which are subsequently let through the net members 18 to become foam of uniform bubbles and dispensed through the dispenser nozzle 17.

At this time, the interior of the container is set at a negative pressure due to consumption and decrease of the liquid A, so that the tongue portion 2*b* is elastically deformed outwardly to open the outer air inlet hole 3*g*, and the outer air is drawn into the upper space in the container to release it from the negative pressure. When the container is released from the negative pressure, the tongue portion 2*b* closes the outer air inlet hole 3*g*. By further reciprocal movements of the piston assembly, stable foam of a constant mixing ratio of the air to liquid is dispensed at all times in need.

Figure 5:
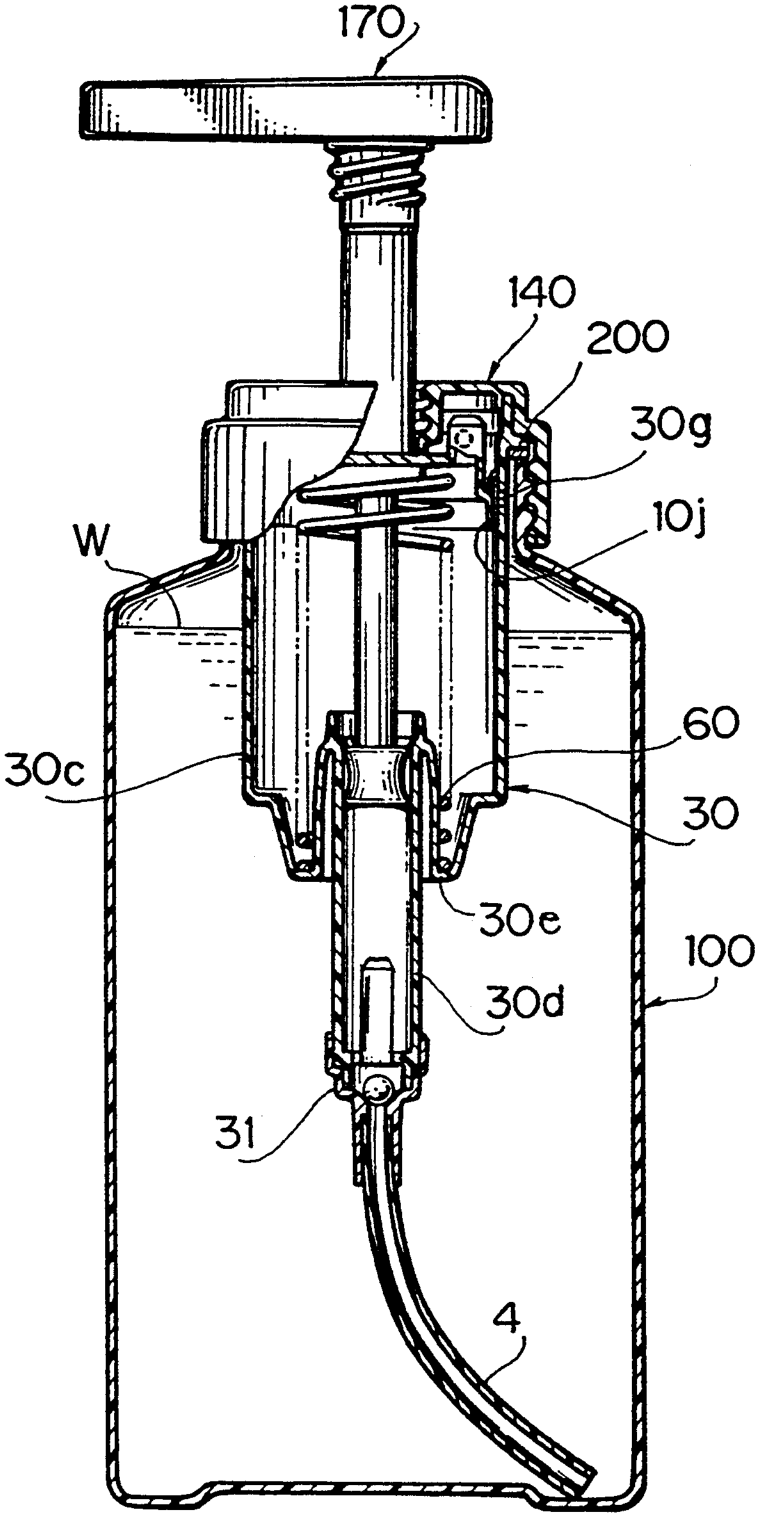
FIG. 5 is a longitudinal sectional view showing a foam dispensing pump container according to the second embodiment.

FIG. 5 is a longitudinal sectional view showing the second embodiment of a foam dispensing pump container. Since the basic arrangement of the second embodiment is substantially the same as that of the first embodiment, only different portions will be described. Referring to FIG. 5, a lid member 140 has functions to serve as a guide hole for guiding a dispenser nozzle member 170 and same time threadably engage the dispenser nozzle member 170 with a container 100. A coil spring 60 is provided not in a liquid cylinder 30*d* but in an air cylinder 30*c*. The aforesaid outer air inlet hole portion now identified as 30*g* is sealed by a slidable seal portion 10*j* of an air piston. Provided at the bottom portion of the liquid cylinder 30*d* is an urging insertion component 31 for accommodating and holding a second ball 8 and holding a pressure fitted dip tube 4. In the second embodiment having the aforesaid arrangement, stable foam with a constant mixing ratio of air to liquid can be dispensed by reciprocal movement of the piston assembly.

As has been described above, according to the present invention, there is provided a foam dispensing pump container in which the resistance in introducing outer air is kept to a minimum to ensure smooth reciprocal movement of the piston assembly, the net member or the porous member may not be clogged with a dried and solidified liquid component of the foam remaining therein, and the quantity of air introduced into the air cylinder always remains constant to maintain a given mixing ratio of liquid and air.

There is also provided a foam dispensing pump container in which the nozzle member can be threadably engaged with the lid member to maintain the hermetic state of the container when the container is not in use.

Since air is introduced into the air cylinder from the outside of the container, no extra space is needed in the upper portion of the container, and the container can carry the liquid up to a level close to the outer air inlet hole in the upper portion of the cylinder.

As has been described above, foam is generated in the mixing chamber 11 and then homogenized by the sheet-like net members 18. Therefore, even if clogging is caused in the net members 18 by an unpredictable cause after dispensing the foam, the clogging is readily cleared as the sheet-like net members 18 are thin and the clogging substance is dissolved in the subsequent foam dispensing operation by the liquid constituting the foam. In addition, since introduction of outer air is performed through the gap, it does not adversely affect the reciprocal movement of the piston assembly at all.

The inventor's experiment by removal of the sheet-like net members 18 has shown that bubbles of the foam generated in the mixing chamber 11 have random diameter sizes.

The preferred embodiments of the present invention have been described in detail with reference to the accompanying drawings but it is to be understood that the practical arrangement is not limited to these specific embodiments, and that various design changes may be made without departing from the spirit and scope of the present invention.

We claim:

1. A foam dispensing pump container comprising a double cylinder which is provided inside an opening portion of a container containing a liquid and which is constituted by an air cylinder for pumping air and a liquid cylinder for pumping a liquid, both arranged concentrically, a dip tube for allowing a bottom portion of said liquid cylinder and a bottom portion of said container to communicate with each other, a piston assembly constituted by an air and a liquid piston concentrically and integrally provided to move reciprocally in said air and liquid cylinders respectively, a nozzle member provided at an upper end of said piston assembly and having a foam dispensing hole portion, an air flow path for allowing said hole portion and an interior of said air cylinder to communicate with each other, a liquid flow path for allowing an interior of said liquid cylinder and said hole portion to communicate with each other, a first check valve disposed midway along said liquid flow path, a second check valve disposed in said liquid cylinder, a porous member disposed in said hole portion, a compression spring for urging said piston assembly to a top dead point with respect to said double cylinder, an outer air inlet hole formed in said air cylinder to allow the liquid in said container and outer air outside said container to communicate with each other to prevent the interior of said container from being set at a negative pressure and having an operational valve, and a lid member for fixing said double cylinder to said container and guiding insertion of said piston assembly therethrough, characterized in that said porous member is constituted by a porous sheet-like member, a juncture where said liquid flow path and said air flow path join with each other is provided upstream of said porous sheet-like member to serve as a mixing chamber for mixing the liquid and air, said liquid cylinder extends downwardly from a bottom surface of said air cylinder so that a slidable portion of said air piston and a slidable portion of said liquid piston of said piston assembly are set for said reciprocal movement at different elevations, and a third check valve is provided in said air piston so that outer air is introduced into an air chamber, defined by said air cylinder and said air piston, through an insertion gap between an outer circumferential surface of said air piston and an insertion hole of said lid member.

2. A foam dispensing pump container comprising a double cylinder which is provided inside an opening portion of a container containing a liquid and which is constituted by an air cylinder for pumping air and a liquid cylinder for pumping a liquid, both arranged concentrically, a dip tube for allowing a bottom portion of said liquid cylinder and a bottom portion of said container to communicate with each other, a piston assembly constituted by an air piston and a liquid piston concentrically and integrally provided to move reciprocally in said air and liquid cylinders respectively, a nozzle member provided at an upper end of said piston assembly and having a foam dispensing hole portion, an air flow path for allowing said hole portion and an interior of said air cylinder to communicate with each other, a liquid flow path for allowing an interior of said liquid cylinder and said hole portion to communicate with each other, a first check valve disposed midway along said liquid flow path, a second check valve disposed in said liquid cylinder, a porous member disposed in said hole portion, a compression spring for urging said piston assembly to a top dead point with respect to said double cylinder, an outer air inlet hole formed in said air cylinder to allow the liquid in said container and outer air outside said container to communicate with each other to prevent the interior of said container from being set at a negative pressure and having an operational valve, and a lid member for fixing said double cylinder to said container and guiding insertion of said piston assembly therethrough, characterized in that said porous member is constituted by a porous sheet-like member, a juncture where said liquid flow path and said air flow path join with each other is provided upstream of said porous sheet-like member to serve as a mixing chamber for mixing the liquid and air, said liquid cylinder extends downwardly from a bottom surface of said air cylinder so that a slidable portion of said air piston and a slidable portion of said liquid piston of said piston assembly are set for said reciprocal movement at different elevations, a third check valve is provided in said air piston so that outer air is introduced into an air chamber, defined by said air cylinder and said air piston, through an insertion gap between an outer circumferential surface of said air piston and an insertion hole of said lid member, and an externally threaded portion is formed on said outer circumferential surface of said air piston in the vicinity of said nozzle member and an internally threaded portion is formed on said lid member to threadably engage with said externally threaded portion, such that a threadable engagement of said air piston and said lid member is maintained against repelling force of said compression spring.

3. A foam dispensing pump container according to claim 2, including first means for sealing between said double cylinder and said container, second means for sealing a hole portion in said double cylinder, and third means for sealing said liquid piston, said first, second, and third sealing means to cut off communication between the liquid in said container and outer air while in said threadable engagement.

4. A foam dispensing pump container according to claim 1, wherein said compression spring is disposed in said liquid cylinder.

5. A foam dispensing pump container according to claim 1, wherein said sheet-like member is a net member having predetermined meshes and a predetermined thickness, and at least one sheet-like member is disposed to homogenize bubbles of foam to have a uniform diameter.

6. A foam dispensing pump container according to claim 1, wherein a taper portion is formed on an inner circumferential surface of said double cylinder in order to easily fit and insert said piston assembly in said double cylinder during assembly.

7. A foam dispensing pump container according to claim 1, wherein said operational valve is formed as a thin tongue portion of a seal member interposed to maintain a hermetic seal between said lid member and said container.

8. A foam dispensing pump container according to claim 1, wherein said first to third check valves comprise ball members.

9. A foam dispensing pump container according to claim 1, wherein a ball member of said first check valve is urged by a compression spring to close said first check valve.

10. A foam dispensing pump container according to claim 2, wherein a taper portion is formed on an inner circumferential surface of said double cylinder in order to easily fit and insert said piston assembly in said double cylinder during assembly.

11. A foam dispensing pump container according to claim 2, wherein said compression spring is disposed in said liquid cylinder.

12. A foam dispensing pump container according to claim 2, wherein said sheet-like member is a net member having predetermined meshes and a predetermined thickness, and at least one sheet-like member is disposed to homogenize bubbles of foam to have a uniform diameter.

13. A foam dispensing pump container according to claim 2, wherein a ball member of said first check valve is urged by a compression spring to close said first check valve.

14. A foam dispensing pump container according to claim 2, wherein said operational valve is formed as a thin tongue portion of a seal member interposed to maintain a hermetic seal between said lid member and said container.

15. A foam dispensing pump container according to claim 2, wherein said first to third check valves comprise ball members.

* * * * *

UNITED STATES PATENT AND TRADEMARK OFFICE

CERTIFICATE OF CORRECTION

PATENT NO. : 5,271,530

DATED : December 21, 1993

INVENTOR(S) : Uehira et al

It is certified that error appears in the above-indentified patent and that said Letters Patent is hereby corrected as shown below:

Column 1, line 8, after "it" insert --a--

Column 5, line 25, after "the" (second instance) insert --central portion of a bottom portion 3e of the air--

Column 10, line 44, replace "led" with --let--

Column 10, line 47, replace "led" with --let--

Signed and Sealed this

Twenty-second Day of November, 1994

Attest:

BRUCE LEHMAN

*Attesting Officer*

*Commissioner of Patents and Trademarks*